(12) United States Patent
Commisso et al.

(10) Patent No.: US 11,760,542 B2
(45) Date of Patent: Sep. 19, 2023

(54) DISPOSABLE COVER FOR DRINK CONTAINER

(71) Applicant: My Cup Condom LLC, Medford, NY (US)

(72) Inventors: Nicole Commisso, Medford, NY (US); Christine Mortarotti, Medford, NY (US)

(73) Assignee: MY CUP CONDOM LLC, Medford, NY (US)

(*) Notice: Subject to any disclaimer, the term of this patent is extended or adjusted under 35 U.S.C. 154(b) by 0 days.

(21) Appl. No.: 17/644,736

(22) Filed: Dec. 16, 2021

(65) Prior Publication Data

US 2022/0106080 A1 Apr. 7, 2022

Related U.S. Application Data

(63) Continuation of application No. 16/721,781, filed on Dec. 19, 2019, now Pat. No. 11,235,913.

(60) Provisional application No. 62/838,585, filed on Apr. 25, 2019.

(51) Int. Cl.
*B65D 41/22* (2006.01)
*A47G 19/22* (2006.01)

(52) U.S. Cl.
CPC ......... *B65D 41/22* (2013.01); *A47G 19/2272* (2013.01); *A47G 2400/123* (2013.01)

(58) Field of Classification Search
CPC .... B65D 41/525; B65D 41/52; B65D 41/225; B65D 41/22; B65D 41/02; B65D 43/0214; B65D 43/0222; A47G 19/2272; A47G 19/2266; A47G 19/2205

USPC .......... 220/780, 796, 287, DIG. 30, DIG. 19
See application file for complete search history.

(56) References Cited

U.S. PATENT DOCUMENTS

| | | | |
|---|---|---|---|
| 1,243,033 A | 10/1917 | Beatty | |
| 1,597,130 A * | 8/1926 | Weeks | B65D 39/04 215/292 |
| 2,378,470 A * | 6/1945 | Di Cosmo | B65D 3/10 229/5.5 |
| 2,718,322 A | 2/1951 | Wilcox | |
| 2,984,381 A | 5/1961 | Bennett | |
| 3,862,614 A | 1/1975 | Kovac | |
| 3,880,288 A | 4/1975 | Hunter | |
| 4,901,881 A | 2/1990 | McElroy | |
| 4,934,558 A | 6/1990 | Vargas | |
| 6,276,551 B1 | 8/2001 | Miller | |

(Continued)

FOREIGN PATENT DOCUMENTS

GB 2238303 A 5/1991

OTHER PUBLICATIONS

European Search Report for Application No. 20171062.1, dated Sep. 23, 2020, 6 pages.

*Primary Examiner* — Robert J Hicks
(74) *Attorney, Agent, or Firm* — Hoffman Warnick LLC

(57) ABSTRACT

A disposable, non-toxic, biodegradable, flexible cover fitting on beverage containers to protect from unwanted contamination or spillage is described. In one embodiment, the flexible cover includes a system comprising a tamper-evident package and a cover sealed within the tamper-evident package, the cover including a flexible body having a substantially flat, circular shape and a first thickness and a bead having a second thickness disposed about a circumference of the flexible body, wherein the second thickness is greater than the first thickness.

14 Claims, 3 Drawing Sheets

(56) References Cited

U.S. PATENT DOCUMENTS

| | | |
|---|---|---|
| 2006/0131308 A1 | 6/2006 | Drake |
| 2008/0083693 A1 | 4/2008 | Gottlieb |
| 2014/0091103 A1 | 4/2014 | Neitzel |
| 2016/0262558 A1 | 9/2016 | Beck |
| 2020/0337431 A1 | 10/2020 | Benarde |

* cited by examiner

DISPOSABLE COVER FOR DRINK CONTAINER

CROSS-REFERENCE TO RELATED APPLICATIONS

This application is a continuation of co-pending U.S. patent application Ser. No. 16/721,781, filed 19 Dec. 2019, which claims priority to and the benefit of U.S. Provisional Patent Application No. 62/838,585, filed 25 Apr. 2019, each of which is hereby incorporated herein as though fully set forth.

BACKGROUND

When purchasing or being served a beverage at drinking establishments, especially in places which are dark or dimly lit and crowded, the open container is vulnerable to unwanted contamination (spiked or "roofied" or drugged, dirt, sand, bugs, etc.) and spillage due to movement such as walking or dancing.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
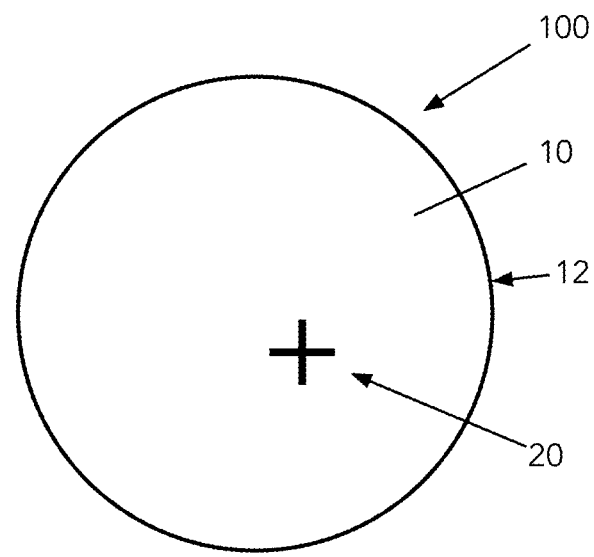
FIG. 1 shows a schematic top view of a device according to one embodiment of the invention.

It is noted that the drawings of the invention are not to scale. The drawings are intended to depict only typical aspects of the invention, and therefore should not be considered as limiting the scope of the invention.

SUMMARY

In one embodiment, the invention provides a cover for a drink container, the cover comprising: a flexible body having a substantially circular shape; a bead disposed about a circumference of the flexible body; and an indicator visible on at least one surface of the body at which a puncture through the body may be made.

In another embodiment, the invention provides a system comprising: a tamper-evident package; and a cover sealed within the tamper-evident package, the cover including: a flexible body having a substantially circular shape; a bead disposed about a circumference of the flexible body; and an indicator visible on at least one surface of the body at which a puncture through the body may be made.

In still another embodiment, the invention provides a cover for a drink container, the cover comprising: a flexible body having a substantially circular shape; and a bead disposed about a circumference of the flexible body.

DETAILED DESCRIPTION

This disposable, non-toxic, biodegradable food grade cover is flexible to fit securely over a beverage container purchased at a drinking establishment by manually stretching the cover device over the top of the beverage container, so it tightly fits around the rim of the drink. This cover will prevent unwanted contaminants from entering a beverage container as the container will no longer be vulnerable or widely open. There is a labeled location on this device to enable a drinking straw to safely pierce through it in order to consume the beverage while still protecting the drink. The cover will also prevent the beverage from spilling out of the container due to movement in the establishment, such as dancing or walking around, as it securely seals the top of the container where the beverage would spill over the sides.

Known methods of securing a beverage container from contamination or spillage in a drinking establishment typically involve manually covering the container with a hand or fingers, holding it at a higher level, actively watching it, and/or physically attempting to keep it from spilling. This invention renders manually covering a drink to prevent contamination or attempting to keep it from spilling unnecessary, or significantly reducing the effort and worry to keep the beverage safe.

To manually cover a drink to prevent contamination or spillage is inefficient and inconvenient. Other lids, caps, or covers that may cover a drink at an establishment typically will not fit the various sizes or types of containers in which these beverages are offered.

Manually covering a beverage container purchased at a drinking establishment with a hand, fingers, holding a beverage at a higher level, actively watching your drink, and/or physically attempting to keep it from spilling is inefficient, as a result, the danger of contamination and spillage is inevitable due to human error, accidents, and malicious acts. Also, embodiments of the invention provide protection from contamination by things such as dirt, sand, bugs, etc. and spillage at places like the park/beach/outside or areas.

The invention described here reduces the danger, worry, and effort required when using an open beverage container in a drinking establishment by protecting the beverage inside the container from contamination or spillage with the non-toxic, biodegradable, flexible cover which seals the top of the container. This results in decreased worry and effort and increases safety by protecting the beverage container from contamination or spillage.

FIG. 1 shows a top view of cover 100 according to an embodiment of the invention. Cover 100 comprises a substantially circular body 10 bordered by a circumferential bead 12. Cover 100, including body 10 and bead 12, may be formed from or include any number of materials. Natural rubber latex, silicone, nitrile (synthetic), and biodegradable silicone, for example, are among the materials from which cover 100 may be formed. Natural rubber latex is particularly preferred in many embodiments, given its flexibility and tendency to grip or adhere to the outer surfaces of the containers to which cover 100 will be applied.

Cover 100 may similarly be of any size appropriate for application to a drink container. Typically, cover 100 is about two inches in diameter, which makes it applicable to a large number of containers.

Bead 12 is generally thicker than the remainder of body 10. In one embodiment, for example, bead is approximately 0.08 inches thick while the remainder of body 10 is approximately 0.0105 inches thick. These particular dimensions are neither necessary nor essential, however, and other dimensions may be employed in practicing the invention, as should be apparent to one skilled in the art.

Cover 100 may, according to some embodiments of the invention, include an indicator 20 of a point at which a straw may be inserted through cover 100. Depending on the material or materials from which cover 100 is formed, indicator 20 may include a weakening in cover 100 to aid in insertion of the straw. In other embodiments, indicator 20 may include an existing opening through cover 100, such as a small circular opening. As an aid in identifying indicator 20 and/or to reduce the risk of damage to cover 100, such an opening may include a border, grommet, lip, or other feature.

Figure 2:
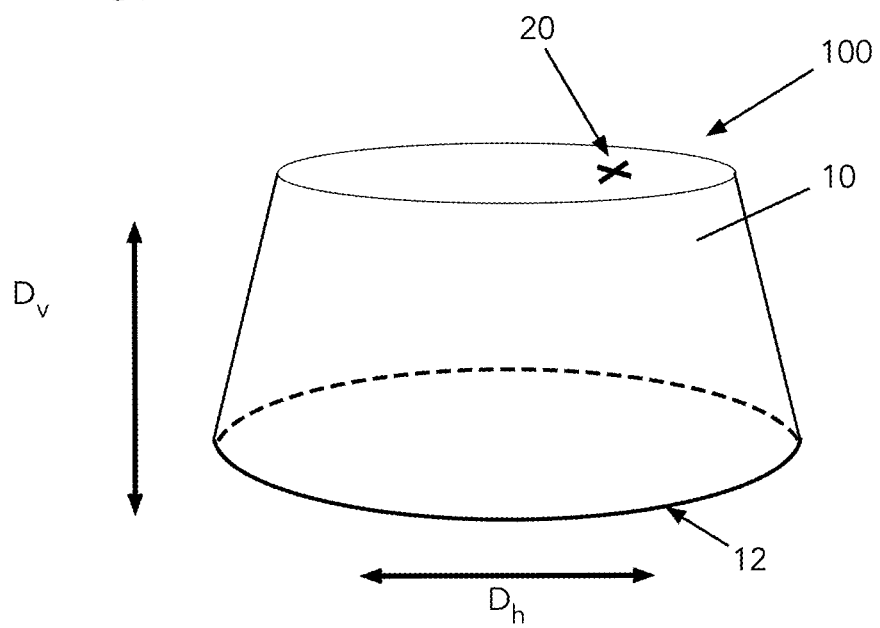
FIG. 2 shows a schematic side view of a device according to an embodiment of the invention.

FIG. 2 shows a side view of cover 100, which has been stretched both vertically ($D_v$) and horizontally ($D_h$), as will be done in placing cover 100 over a cup or other vessel. When stretched in such manner and subsequently released, cover 100 is of a size and elasticity such that, when released, contracts and closes on an outer surface of the cup or other vessel, thereby securing 100 over an opening of the cup or other vessel. The material of body 10 and/or bead 12 preferably exhibits friction against plastics and glasses to further secure cover 100 against the cup or other vessel.

Figure 3:
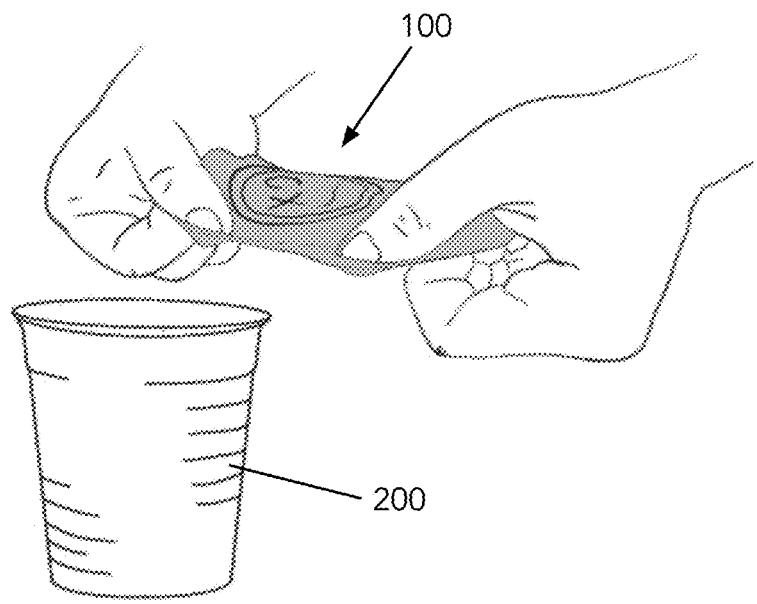
FIG. 3 shows a schematic view of a device according to an embodiment of the invention being prepared for use.
Figure 4:
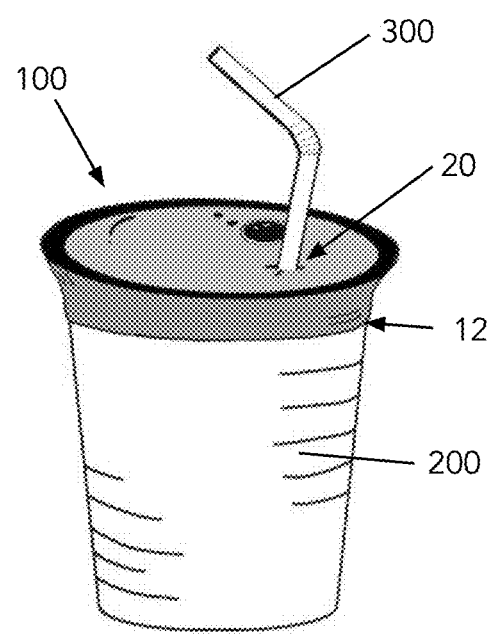
FIG. 4 shows a schematic view of a device according to an embodiment of the invention in use.

FIG. 3 shows cover 100 being stretched horizontally by a user prior to placing cover over cup 200. FIG. 4 shows cover 100 in place over cup 200 with a straw 300 inserted through indicator 20. As can be seen, bead 12 is disposed adjacent an outer surface of cup 200.

Figure 5:
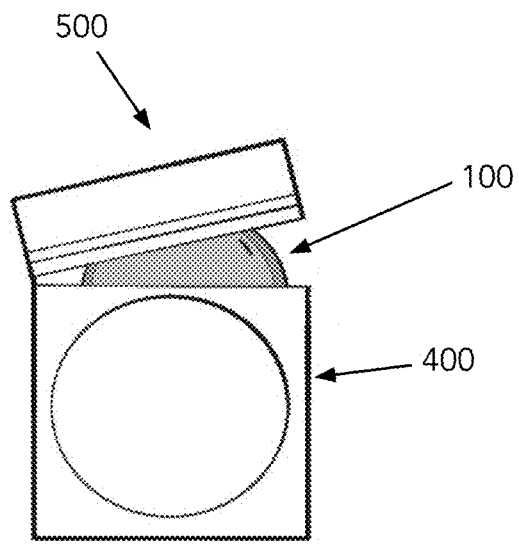
FIG. 5 shows a schematic view of a system according to an embodiment of the invention.

FIG. 5 shows a system 500 according to an embodiment of the invention. System 500 includes a cover 100 within a package 400. Package 400 may be an envelope or wrapper capable of being sealed to contain cover 100 until use and opened, such as by tearing, as shown in FIG. 5. Package 400 is preferably tamper-evident, such that it cannot be opened and resealed without making it evident that such had been done.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprise," "comprises," and/or "comprising," when used in this specification, specify the presence of the stated features, steps, elements, and/or components, but do not preclude the presence or addition of one or more other features, steps, elements, components, and/or groups thereof.

This written description uses examples to disclose the invention, including the best mode, and also to enable any person skilled in the art to practice the invention, including making and using any devices or systems and performing any related or incorporated methods. The patentable scope of the invention is defined by the claims, and may include other examples that occur to those skilled in the art. Such other examples are intended to be within the scope of the claims if they have elements that do not differ from the literal language of the claims, or if they include equivalent structural elements with insubstantial differences from the literal language of the claims.

The invention claimed is:

1. A cover for a drink container, the cover comprising:
   a flexible body having a substantially flat, circular shape and a first thickness; and
   a bead having a second thickness disposed about a circumference of the flexible body, wherein the second thickness is greater than the first thickness.

2. The cover of claim 1, wherein the body includes at least one elastic material selected from a group consisting of: a natural rubber latex, silicone, nitrile, and biodegradable silicone.

3. The cover of claim 2, wherein the at least one elastic material includes a natural rubber latex.

4. The cover of claim 1, wherein the body is adapted to adhere to a glass or plastic surface when stretched.

5. The cover of claim 1, wherein the body includes a perforation or weakening.

6. The cover of claim 1, wherein the flexible body is flexible in directions both horizontal and vertical to an opening of the drink container.

7. The cover of claim 1, wherein the second thickness is greater than the first thickness with respect to a central axis.

8. A system comprising:
   a tamper-evident package; and
   a cover sealed within the tamper-evident package, the cover including:
      a flexible body having a substantially flat, circular shape and a first thickness; and
      a bead having a second thickness disposed about a circumference of the flexible body, wherein the second thickness is greater than the first thickness.

9. The system of claim 8, wherein the body includes at least one elastic material selected from a group consisting of: a natural rubber latex, silicone, nitrile, and biodegradable silicone.

10. The system of claim 9, wherein the at least one elastic material includes a natural rubber latex.

11. The system of claim 8, wherein the body is adapted to adhere to a glass or plastic surface when stretched.

12. The system of claim 8, wherein the body includes a perforation or weakening.

13. The system of claim 8, wherein the flexible body is flexible in directions both horizontal and vertical to an opening of the drink container.

14. The system of claim 8, wherein the second thickness is greater than the first thickness with respect to a central axis.

* * * * *